(12) United States Patent
Huang et al.

(10) Patent No.: US 8,575,075 B2
(45) Date of Patent: *Nov. 5, 2013

(54) OIL-FIELD VISCOSITY BREAKER METHOD UTILIZING A PERACID

(75) Inventors: Shurong Huang, Houston, TX (US); Henry A. Pfeffer, Mercerville, NJ (US); John M. Rovison, Jr., Sanborn, NY (US)

(73) Assignee: FMC Corporation, Philadelphia, PA (US)

( * ) Notice: Subject to any disclaimer, the term of this patent is extended or adjusted under 35 U.S.C. 154(b) by 237 days.

This patent is subject to a terminal disclaimer.

(21) Appl. No.: 12/709,587

(22) Filed: Feb. 22, 2010

(65) Prior Publication Data

US 2010/0222242 A1 Sep. 2, 2010

Related U.S. Application Data

(60) Provisional application No. 61/156,138, filed on Feb. 27, 2009.

(51) Int. Cl.
*C09K 8/60* (2006.01)

(52) U.S. Cl.
USPC ......... 507/267; 507/211; 507/219; 166/305.1

(58) Field of Classification Search
CPC ....................................................... C08K 8/60
USPC ...................... 507/211, 219, 267; 166/305.1
See application file for complete search history.

(56) References Cited

U.S. PATENT DOCUMENTS

| | | | |
|---|---|---|---|
| 2,347,434 A | 4/1944 | Reichert et al. | |
| 2,483,936 A | 10/1949 | Roberts | |
| 2,590,856 A | 4/1952 | Greenspan et al. | |
| 2,609,391 A | 9/1952 | Greenspan et al. | |
| 3,024,191 A | 3/1962 | Jones | |
| 3,167,510 A | 1/1965 | Alter | |
| 3,254,719 A | 6/1966 | Root | |
| 3,329,610 A | 7/1967 | Kreuz et al. | |
| 3,470,959 A | 10/1969 | Kreuz et al. | |
| 3,529,666 A | 9/1970 | Crowe | |
| 3,846,454 A | 11/1974 | Ohnishi et al. | |
| 4,143,007 A | 3/1979 | DeMartino | |
| 4,144,179 A | 3/1979 | Chatterji | |
| 4,152,274 A | 5/1979 | Phillips et al. | |
| 4,169,798 A | 10/1979 | DeMartino | |
| 4,169,818 A | 10/1979 | DeMartino | |
| 4,172,055 A | 10/1979 | DeMartino | |
| 4,464,268 A | 8/1984 | Schievelbein | |
| 4,552,674 A | 11/1985 | Brown et al. | |
| 4,552,675 A | 11/1985 | Brown et al. | |
| 4,588,506 A | 5/1986 | Raymond et al. | |
| 4,591,443 A | 5/1986 | Brown et al. | |
| 4,594,170 A | 6/1986 | Brown et al. | |
| 4,610,795 A | 9/1986 | Norris et al. | |
| 4,995,461 A | 2/1991 | Sydansk | |
| 5,028,341 A | 7/1991 | Liao | |
| 5,055,209 A | 10/1991 | Bridges et al. | |
| 5,080,809 A | 1/1992 | Stahl et al. | |
| 5,106,518 A | 4/1992 | Cooney et al. | |
| 5,238,065 A | 8/1993 | Mondshine et al. | |
| 5,253,711 A | 10/1993 | Mondshine | |
| 5,268,112 A | 12/1993 | Hutchins et al. | |
| 5,607,905 A | 3/1997 | Dobson, Jr. et al. | |
| 5,624,886 A | 4/1997 | Dawson et al. | |
| 5,783,527 A | 7/1998 | Dobson, Jr. et al. | |
| 5,981,447 A | 11/1999 | Chang et al. | |
| 6,737,385 B2 | 5/2004 | Todd et al. | |
| 6,764,981 B1 | 7/2004 | Eoff et al. | |
| 6,793,018 B2 | 9/2004 | Dawson et al. | |
| 6,818,594 B1 | 11/2004 | Freeman et al. | |
| 6,861,394 B2 | 3/2005 | Ballard et al. | |
| 6,983,801 B2 | 1/2006 | Dawson et al. | |
| 6,986,391 B2 | 1/2006 | Funkhouser et al. | |
| 7,156,178 B2 | 1/2007 | Rae et al. | |
| 7,159,656 B2 | 1/2007 | Eoff et al. | |
| 7,273,100 B2 | 9/2007 | Reddy et al. | |
| 7,325,615 B2 | 2/2008 | Kriegel et al. | |
| 7,384,892 B2 | 6/2008 | Melbouci et al. | |
| 7,431,087 B2 | 10/2008 | Sullivan et al. | |
| 2004/0206502 A1 | 10/2004 | Reddy et al. | |
| 2005/0227874 A1 | 10/2005 | Berger et al. | |
| 2006/0137875 A1 | 6/2006 | Dusterhoft et al. | |
| 2006/0199742 A1 | 9/2006 | Petrus et al. | |
| 2006/0283592 A1 | 12/2006 | Sierra et al. | |
| 2007/0111898 A1 * | 5/2007 | Frost et al. | 507/214 |
| 2007/0163779 A1 | 7/2007 | Rae et al. | |
| 2007/0284101 A1 | 12/2007 | Valeriano et al. | |
| 2009/0088347 A1 * | 4/2009 | Mukhopadhyay et al. | 507/211 |
| 2010/0048431 A1 * | 2/2010 | Saini et al. | 507/219 |

FOREIGN PATENT DOCUMENTS

| | | |
|---|---|---|
| EP | 0 563 584 B1 | 9/1995 |
| EP | 1 900 902 A1 | 3/2008 |
| GB | 925 373 | 5/1963 |
| WO | 00/04777 A1 | 2/2000 |

OTHER PUBLICATIONS

BJ Services, Ferrotrol Technical Bulletin, (Mar. 2007).
BJ Services, Ferrotrol Technical Bulletin, (May 1999).
BJ Services, GBW Oxidative Breakers Technical Bulletin, (May 1999).
BJ Services, Thermo-Plug II Blocking Gel Technical Bulletin, (Sep. 2004).
FMC Peracetic Acid 15-10 MSDS (2007).
FMC Peracetic Acid 15-10 Technical Data Sheet (2007).
FMC Peracetic Acid 15-23 MSDS (2006).
Nalco ASP 820 Friction Reducer MSDS (2006).
Nalco ASP 820 Multipurpose Friction Reducer Product Sheet (2004).

* cited by examiner

*Primary Examiner* — Alicia Toscano
(74) *Attorney, Agent, or Firm* — FMC Corporation

(57) ABSTRACT

Aqueous well treatment fluid compositions are disclosed comprising an aqueous fluid containing polymer or copolymer for modifying fluid viscosity of the aqueous fluid and, in addition, an agent for effecting a controlled reduction in the aqueous fluid viscosity in a subterranean environment. The viscosity-reducing agent comprises a dilute concentration of peracetic acid. A method of using such compositions in oil- and gas-field treatment operations is also disclosed.

8 Claims, No Drawings

OIL-FIELD VISCOSITY BREAKER METHOD UTILIZING A PERACID

FIELD OF THE INVENTION

The present invention relates to a viscosity breaker for aqueous treatment fluids used in oil- and gas-field operations. More particularly, the invention relates to peracetic acid and other peracids useful as viscosity reducing agents in oil- and gas-field well treatment applications.

BACKGROUND OF THE INVENTION

In oil- and gas-field operations, polymer additives have been widely used for decades to enhance or modify the characteristics of the aqueous fluids used in well drilling, recovery and production applications.

One example of such use is for viscosity enhancement in water or other water-based (i.e., aqueous) fluids used for hydraulic fracturing treatments in subterranean well formations. Hydraulic fracturing creates fluid-conductive cracks or pathways in the subterranean rock formations in gas- and/or oil-producing zones, improving permeability of the desired gas and/or oil being recovered from the formation via the wellbore.

Many aqueous fracturing fluids utilize natural or synthetic viscosity-increasing polymers, some of which are categorized as gelling agents. Examples of such natural and synthetic polymer additives in fracturing fluids include guar, xanthan, cellulose derivatives and acrylamide-derived and acrylate-derived polymers and copolymers, and the like. Such polymers or copolymers may also be crosslinked to enhance their thickening or gelling properties.

The thickening or gel-forming additives allow the aqueous well fluid to carry a significant amount of a proppant, typically an inorganic solids propping agent like sand, into the fractures and fissures in the formation without premature settling of the proppant.

The polymer-thickened or polymer-gelled aqueous well fracturing fluid normally serves its intended purpose, propping open fractures and fissures in the oil- or gas-bearing formation via the suspended proppant, within a period of a few hours of its being introduced into the formation. A breaking agent or breaker, a component that is typically present in the original fracturing fluid formulation, is normally activated after the fracturing is completed to reduce (break) the viscosity of the gelled or thickened aqueous fluid, so as to facilitate recovery of the petroleum or hydrocarbon product. The breaking agents may be coated with various materials to delay their activity in the aqueous well fracturing fluid.

Commonly used or preferred breaking agents fall into two broad categories, enzymes (e.g., U.S. Pat. No. 7,431,087 of Sullivan et al.) and oxidizers. The second category includes persulfates (U.S. Pat. No. 3,167,510 of Alter; U.S. Pat. No. 4,552,675 of Brown et al.; U.S. Pat. No. 4,610,795 of Norris et al.), perborates (U.S. Pat. No. 3,024,191 of Jones), sodium and hydrogen peroxide (U.S. Pat. No. 2,483,936 of Roberts), and calcium, magnesium and zinc peroxides (U.S. Pat. No. 6,737,385 of Todd et al.).

Aqueous peracetic acid solutions have had limited use in commercial well drilling operations, and only a few uses in such applications are described or suggested in the patent literature.

Peracetic acid has been described as a bactericide for use in water, called flood waters, used in secondary oil recovery, in U.S. Pat. No. 3,329,610 of Kreuz et al., 1967). Another use for peracetic acid is well cleaning described in U.S. Pat. No. 3,470,959 of Kreuz et al., where peracetic acid is added to water (normally potable water) that is injected into so-called recharge wells that are used in conjunction with the removal of potable water from coastal underground potable water basins.

In well treatment operations involving the use of polymer thickeners, many oxidizing compounds have been mentioned in the patent literature as being potentially useful as viscosity breakers. Peracetic acid has been mentioned as one of many known oxidizers in many early and more recent patents as having potential usefulness as a viscosity breaker, e.g., U.S. Pat. No. 4,172,005 of DeMartino, U.S. Pat. No. 4,169,818 of DeMartino, U.S. Pat. No. 4,169,798 of DeMartino, U.S. Pat. No. 4,143,007 of DeMartino, U.S. Pat. No. 6,764,981 of Eoff et al., U.S. Pat. No. 7,159,656 of Eoff et al., U.S. Patent Publication No. 2004/0206502 of Reddy et al., U.S. Patent Publication No. 2006/0137874 of Dusterhoft et al. and U.S. Patent Publication No. 2006/0283592 of Sierra et al. None of these patents describes peracetic acid as being a preferred oxidizer for use as a viscosity breaker, much less exemplifies such use.

In another application in oil and gas well operations, hydrogen peroxide and per-acids such as peracetic acid are described as useful, in buffered solutions having $H_2O_2$ of 1-6 wt % or peracid concentrations of 1-15 wt %, for improving the permeability of wells by removing polymer deposits, in U.S. Pat. No. 7,156,178 of Rae et al.

The present invention provides an aqueous well treatment fluid containing a viscosity-enhancing polymer or copolymer in which a peracetic acid or other peracid is employed as a viscosity reducing agent, present in dilute concentrations, that is useful for effecting controlled and delayed viscosity-reduction activity in aqueous fluids intended for oil- and gas-field operations.

BRIEF SUMMARY OF THE INVENTION

One aspect of the present invention is an aqueous well treatment fluid composition comprising an aqueous fluid medium containing a polymer or copolymer for increasing fluid viscosity or otherwise modifying fluid viscosity of the aqueous fluid composition; the aqueous fluid composition further comprising, as an agent for effecting a controlled reduction in the aqueous fluid viscosity in a subterranean environment, an organic monocarboxylic peracid in an amount of about 1 ppm to about 1000 ppm; and the aqueous fluid composition being adjusted to a pH value of at least about 6.

Another embodiment of the invention is an aqueous well treatment fluid composition comprising an aqueous fluid medium containing a polymer or copolymer for increasing fluid viscosity or otherwise modifying fluid viscosity of the aqueous fluid composition; the aqueous fluid composition further comprising, as an agent for effecting a controlled reduction in the aqueous fluid viscosity in a subterranean environment, peracetic acid in an amount of about 1 ppm to about 1000 ppm; and the aqueous fluid composition being adjusted to a pH value of at least about 6.

Yet another embodiment of the present invention is a method providing controlled viscosity-reducing activity in a well treatment fluid comprising introducing, into an aqueous well treatment fluid composition comprising a polymer or copolymer for increasing fluid viscosity or otherwise modifying fluid viscosity of the aqueous fluid composition, an agent for effecting a controlled reduction in the aqueous fluid viscosity in a subterranean environment; the viscosity-reducing agent comprising a peracid in an amount of about 1 ppm to about 1000 ppm; adjusting the pH of the aqueous fluid composition to a pH value of at least about 6; and directing the aqueous well treatment fluid composition into a subterranean environment for which treatment is desired, the ground temperature of the subterranean environment being at least about 30° C.

DETAILED DESCRIPTION OF THE INVENTION

Overview of Invention

The present invention is directed to peracids, peracetic acid in particular being preferred, that are highly suitable for controlled viscosity reduction or for controlled degradation of functional polymers that enhance fluid viscosity or fluid flow characteristics and that are present in aqueous well treatment fluids used in various aspects of subterranean oil- and gas-field well operations.

Many aqueous well treatment fluids employ polymer or copolymer additives that function to enhance or otherwise modify the viscosity characteristics of the aqueous well fluid, e.g., to increase fluid viscosity to provide a more viscous, thickened or partially gelled fluid (to maintain solid additives present in the fluid in suspension during well process operations) or reduce flowing friction (to enhance fluid flow characteristics).

These aqueous well treatment fluids are used in subterranean environments for various functions, either in well boreholes or in oil- or gas-bearing underground formations, or like subterranean locales. A major use of viscous or thickened aqueous well treatment fluids containing viscosity-enhancing polymers is for fracturing oil- or gas-bearing formations, to improve the subsequent recovery of the gas or oil product from the formation.

After these polymer- or copolymer-containing aqueous well treatment fluids have served their intended purpose, it is normally desirable to reverse the viscosity-modifying effects of these polymer/copolymer additives, e.g., in order to facilitate recovery of the gas or oil products being withdrawn from the subterranean formation. In the case of polymer or copolymer products used to provide a more viscous, thickened or partially gelled fluid that is employed in the initial fracturing of a gas- or oil-containing formation, conventional fluid additives called viscosity "breakers" are utilized to reverse or undo the effects of the viscosity-enhancing polymer/copolymer additives.

The peracetic acid and other peracids of this invention provide highly effective and controlled viscosity reduction in aqueous well treatment fluids employing viscosity-modifying polymers. With the peracetic acid or other peracid of this invention, the viscosity reduction, or breaking, activity can be controlled or otherwise delayed, typically for a few hours. This controlled or delayed viscosity reducing activity of the peracids of this invention allows the functional properties of the viscosity-modifying polymer- or copolymer-containing aqueous well treatment fluids to be fully effective during the fracturing or other well treatment operational phase.

Optimal control of the peracetic acid or other peracid viscosity reducing agents of this invention is achieved, as described in more detail below, by appropriate selection of the pH for the aqueous treatment fluid, preferably at least about pH 6 and more preferably at least about pH 7, and by appropriate selection or determination of fluid temperature, at least about 30° C. and preferably at least about 50° C. Importantly, the excellent viscosity reduction control with the peracids of this invention is achieved with relatively low peracid concentrations, ranging from about 1 to 1000 ppm, preferably at least about 10 ppm and preferably less than about 300 ppm.

The viscosity reducing activity of the peracids of this invention can thus be controlled to provide effective viscosity reduction that is delayed for a few hours, e.g., about 1 to about 10 hours, allowing the viscosity-modifying polymer in the aqueous well treatment fluid to be introduced into the well and then to effect the desired thickening or other like functionality during the initial phase of the well treatment operations.

Aqueous peracetic acid, the preferred peracid of this invention, has another distinct advantage as viscosity reducing agent for subterranean well processing operations involving oil- and gas-formations. Peracetic acid dissociates into residues that are generally considered environmentally friendly or environmentally neutral residues, namely, acetic acid and hydrogen peroxide, which itself decomposes into oxygen ($O_2$) and water.

Peracetic Acid Background

Peracetic acid, also called peroxyacetic acid or abbreviated as PAA, is a chemical compound well known for its strong oxidizing potential. Peracetic acid has a molecular formula of $C_2H_4O_3$ or $CH_3COOH$, a molecular mass of 76.05 g/mol, and a molecular structure as follows:

(1)

Peracetic acid is a liquid with an acrid odor and is normally sold in commercial formulations as aqueous solutions typically containing, e.g., 5, 15 or 35 wt % peracetic acid. Such aqueous formulations not only contain peracetic acid but also significant concentrations of hydrogen peroxide and acetic acid, in a dynamic chemical equilibrium.

Commercial formulations of aqueous peracetic acid, as noted above, not only contain peracetic acid but also hydrogen peroxide, the latter typically in excess of the peracetic acid concentration, and acetic acid in a dynamic chemical equilibrium, as shown in reaction (2) below.

(2)

This dynamic equilibrium between peracetic acid, acetic acid, hydrogen peroxide and water is essential for maintaining the peracetic acid stability and concentration in commercial aqueous peracetic acid formulations.

Some references in the prior art to commercial peracetic acid solutions state a specific peracetic acid concentration but make no mention of other chemical components. It should be understood that such prior art peracetic acid solutions, which are typically stabilized and equilibrated peracetic acid solutions, must also contain hydrogen peroxide and acetic acid. Even though these latter two components are not explicitly mentioned, aqueous peracetic acid seeks a dynamic equilibrium with hydrogen peroxide and acetic acid, according to reaction (2) above.

Commercial peracetic acid solutions typically contain a concentration of hydrogen peroxide in excess of the peracetic acid concentration, examples being Persan® peracetic acids (Enviro Tech Chemical Services, Modesto Calif.), Peraclean® and Degaclean® peracetic acids (Evonik Industries, Essen, Germany), Proxitane®, Oxystrong® and Perestane® peracetic acids (Solvay S.A., Cheshire, United Kingdom) and Peracetic Acid 5% and Peracetic Acid 15% (15/23) (FMC Corporation, Philadelphia, Pa.).

Commercial formulations of peracetic acid that contain an excess of peracetic acid, as compared to the concentration of hydrogen peroxide also present, are also available, e.g., Peracetic Acid 15% (15/10) and Peracetic Acid 35% (FMC Corporation, Philadelphia, Pa.).

Aqueous solutions of peracetic acid, diluted to concentrations below 5 wt % peracetic acid, are widely used in a variety of end use applications for their wide spectrum antimicrobial and biocidal properties and also for their bleaching properties.

Key Parameters

The peracetic acid and peracid viscosity reducing agents of this invention is noteworthy for their controlled functionality in providing excellent and precise viscosity-reduction for aqueous well treatment fluids containing viscosity-modifying polymers and/or copolymers that enhance fluid viscosity or fluid flow characteristics. In typical well operations, the aqueous well treatment fluids containing viscosity-enhancing polymers and/or copolymers are used to provide the viscosity-enhancing functionality over only a few hours, e.g., between 1-10 hours with 2-5 hours being typical.

After this short period, the viscosity-enhancing functionality is no longer needed, e.g., once well formation fracturing is completed, and the objective then is efficient recovery of the oil or gas product by providing high flow rates. The peracetic acid viscosity breaker of this invention is useful for its ability to provide controlled viscosity-reducing or polymer-degrading functionality after the initial timeframe of viscosity-enhancement has passed.

The peracetic acid and other peracid viscosity reduction functionality may be controlled through selection and/or adjustment of key parameters that affect this functionality. The relative reactivity of peracetic acid is a function of the pH value and the temperature of the aqueous fluid. In addition, the degree of polymer degradation effected by the peracetic acid, at a given pH value and given temperature, is a function of the length of time the aqueous fluid is contacted with the peracetic acid.

Important factors for controlling the onset and degree of viscosity-reducing functionality of the peracetic acid or other peracid include fluid pH (more alkaline pH values promote viscosity reduction activity), fluid temperature (higher temperatures promote viscosity reduction activity), peracid concentration (higher concentrations providing higher activity, particularly at less-than-optimal pH and temperature values).

In addition, the presence of other components, e.g., used as additives in commercial polymer/copolymer-containing aqueous fluids, can also provide enhanced peracid activity, e.g., potassium chloride.

The selection and use of specific parameter values for controlling the viscosity-reducing functionality of peracetic acid and other peracids are discussed in more detail below.

Peracid Concentration; Use/Treatment Methods

The peracetic acid and peracid viscosity breakers of this invention provide effective viscosity reduction activity at relatively low concentrations, a distinct economic advantage for well treatment fluids which are typically used in huge volumes.

The concentration of peracetic acid or other peracids of this invention in the aqueous well treatment fluid is normally used within a concentration range of about 1 ppm to about 1000 ppm (0.1 wt %), with the minimum concentration preferably being 10 ppm and the maximum concentration preferably being 300 ppm. A preferred range for the peracetic acid or other peracid concentration is about 10 ppm to about 300 ppm, and a more preferred concentration range is about 50 ppm to about 200 ppm. These concentrations are based on the weight of the aqueous well fluid composition.

The optimal concentration of peracetic acid or other peracid will depend, in part, on the amount of viscosity-enhancing polymer employed in the aqueous fracturing fluid or other well fluid. For example, higher concentrations of viscosity-enhancing polymer may be required in the aqueous fracturing well fluid when the polymer is a linear polymer, which is typically present at higher concentrations, as compared with a cross-linked polymer which can provide equivalent viscosifying activity at lower use levels. In addition, pH and temperature values of the aqueous well treatment fluid will also affect the amount or concentration of peracid required to effect the desired controlled viscosity-reducing functionality, e.g., to effect a substantial reduction in the fluid viscosity at 24 hours after treatment but still retain significant initial (thickened) fluid viscosity at 3 hours post-treatment.

The peracetic acid or other peracid of this invention is normally present in the aqueous well treatment formulation at the time the latter is introduced into the well, as opposed to the peracid being introduced into subterranean well formation at a later point in time. The method by which the peracetic acid or other peracid is introduced into the aqueous well treatment fluid, to provide the desired peracid concentrations, is not critical, provided that the peracetic acid is well mixed with the aqueous well treatment fluid.

An advantage of peracetic acid and other peracids of this invention is that they are liquids, in contrast to prior art viscosity breakers that are solids. The liquid state of the peracids of this invention facilitates their introduction and dispersion throughout the aqueous well treatment fluid. Introduction of the peracid may be carried out as a continuous addition or may be intermittent, e.g., slug dose addition, provided that effective mixing is achieved. The introduction of the peracid into the aqueous well treatment fluid is preferably carried out immediately before the fluid is pumped into the well for the desired treatment operation.

The peracid may be added directly to the aqueous well fluid composition or added indirectly, via one or more of the fluid's components, e.g., the water source, used to prepare the aqueous well fluid composition. Since concentrated peracid formulations are typically used to provide the desired dilute peracid concentration in the aqueous well treatment fluid, such concentrated peracid should not be added directly to any fluid additive or component with which it may react in such concentrated form.

The peracetic acid or other peracid will typically be used in the form of a commercially-available concentrated formulation, e.g., 15 wt % peracetic acid also containing 10 wt % hydrogen peroxide in a stabilized equilibrated aqueous solution. A sufficient amount of the concentrated peracid solution is added to the aqueous well treatment fluid to provide the desired concentration, e.g., within the preferred concentration range of about 10 ppm to about 300 ppm peracid.

The inventors have also discovered that aqueous peracetic acid solutions in which the hydrogen peroxide concentration is maintained at an enhanced level, i.e., at hydrogen peroxide concentrations greater than that of the peracetic acid in such solutions, are particularly useful as viscosity reducing agents for polymer-containing aqueous well fluids when pH values and/or fluid temperatures and/or peracid concentrations are less than (or outside of) the preferred parameter values. The higher hydrogen peroxide concentration appears to compensate for possible reduced efficiencies of the peracetic acid or other peracid when the preferred parameter values for the latter are less than optimal.

Peracid Stabilizers

Aqueous peracetic acid solutions are susceptible to decomposition, particularly at elevated temperatures, at alkaline pH values and in the presence of impurities, e.g., transition metal ions. The stability of aqueous peracetic acid solutions and other peracid solutions is typically improved by the addition of known hydrogen peroxide or peracid stabilizers. Stabilizers used for stabilization of peracid solutions include pyrophosphoric acid or a pyrophosphate (U.S. Pat. No. 2,347,434 of Reichert et al.), phosphates (U.S. Pat. No. 2,590,856 of Greenspan et al.), phosphonates (GB 925 373 of Henkel GmbH), dipicolinic acid (U.S. Pat. No. 2,609,391 of Greenspan et al.), and tin compounds that are preferably stannates (EP-B1-0 563 584 of Degussa AG).

Commercially-available aqueous peracetic acid and other peracid formulations typically contain one or more stabilizers such as those described above, so no additional stabilization is required for their use in the preparation of the dilute peracid- or peracetic acid-containing aqueous well treatment fluids of this invention.

pH

The pH value for the peracid-containing aqueous well treatment fluids of this invention can range from about neutral to alkaline. The pH values are preferably in the range of at least about pH 6, up to alkaline pH values, with pH values of 7 or more being particularly preferred. A buffer is unnecessary for maintaining the pH in the present invention.

Acid pH values, e.g., pH 5 or less, should be avoided since these acidic pH's are often detrimental to the stability of the viscosity-enhancing polymers or copolymers present in aqueous well treatment fluids, leading to their rapid degradation and loss of the desired degree of viscosity enhancement required for the well treatment operation.

As mentioned, above, a preferred pH for use of the peracids of this invention is a pH value of at least about 7, i.e., pH 7 or higher, for the aqueous well treatment fluid, and more preferably a pH value above about 7. Such neutral to alkaline pH values appear to provide enhanced activity of the peracid, which is useful in effecting the desired controlled viscosity reduction.

A preferred upper pH limit is about 11, since highly alkaline pH values (above about pH 12) may be detrimental to other components typically present in the aqueous well treatment fluid or may be detrimental to or reactive with some minerals that may be present in the subterranean formation being treated. In addition, adjustment of the fluid pH above 11 requires additional alkali pH adjusting agent, at an added cost for treating the large volumes of treatment fluid typically employed in well treatment operations.

In the case of peracetic acid, the preferred peracid, a preferred pH for the well treatment fluid containing peracetic acid is a pH value of above about 7, with a pH value of at least about 8 being most preferred. The dissociation constant (pKa—the negative logarithm of the acid dissociation constant Ka) of peracetic acid is about 8.2 at 25° C. As a consequence, pH values of at least about 8 ensure that the peracetic acid will likely dissociate in the well treatment fluid, a factor that appears to promote the viscosity-reducing activity of peracetic acid when present in aqueous well treatment fluid compositions containing a viscosity-enhancing polymer or copolymer. As mentioned previously, a pH buffer is unnecessary in the practice of the present invention for controlled viscosity reduction in a well treatment fluid.

Adjustment of the fluid pH may or may not be needed with the aqueous well treatment fluid containing a viscosity-modifying polymer, since the pH of the fluid containing the viscosity-modifying polymer and other conventional additives will determine whether further pH adjustment is required.

Commonly available commercial formulations of peracetic acid typically exhibit a pH of about 1-3 when diluted to a 1 wt % solution, but usage amounts of peracetic acid or other peracids in this invention are so small that their addition is not likely to have an appreciable impact on the pH of the aqueous well treatment fluid into which they are introduced.

For an alkaline shift of the pH of the aqueous well treatment fluid, the pH adjusting agent may be an alkaline or basic compound or base, e.g., sodium hydroxide, calcium hydroxide, potassium hydroxide, sodium bicarbonate, sodium carbonate, any of the sodium phosphates, and other like inorganic or organic alkaline compounds and mixtures thereof.

For an acidic shift of the pH of the aqueous well treatment fluid, the pH adjustment agent may be an acid or acidic compound, e.g., sulfuric acid, hydrochloric acid, nitric acid, phosphoric acid, citric acid, acetic acid, tartaric acid, succinic acid and other inorganic or organic acids, or acidic compounds, which are non-reactive with peracetic acid and mixtures thereof. Mineral acids such as sulfuric acid, hydrochloric acid, nitric acid, phosphoric acid are preferred for acidic pH adjustment.

Temperature

The temperature at which the peracid- and peracetic acid-containing viscosity reducing agents of this invention are used in aqueous well treatment fluids may vary over wide ranges. In general, higher temperatures favor increased activity for the peracetic acid and other peracid viscosity reducing agents, resulting in faster viscosity reducing functionality and shortening the time required to reach the desire reduced viscosity endpoint.

The aqueous fluid well treatment compositions of this invention, containing peracetic acid or another peracid as the viscosity reducing agent, should be adjusted to or subjected to a temperature of at least about 30° C., and more preferably at least about 50° C., to effect the viscosity-reduction activity of the peracid. Preferred temperature ranges for the aqueous fluid well treatment compositions of this invention are about 30° C. to about 90° C. and more preferably about 50° C. to about 80° C.

Since large volumes of water are employed in the aqueous well treatment fluids that are introduced into subterranean environments, the actual well treatment fluid temperature is typically the "default" or ambient temperature of the subterranean formation. Heating of the aqueous well treatment fluid at the surface is normally impractical or uneconomic because of the large volumes of fluid involved.

The temperature at which the aqueous well treatment fluid of this invention is subjected or maintained is typically the formation temperature, the temperature of the subterranean formation where the well treatment fluid is employed, i.e., the bottom hole temperature. It should be recognized that oil- and gas-formations are often located at great depths below the earth's surface, where subterranean temperatures are elevated, ranging, e.g., usually from 40° C. to about 130° C.

Aqueous well treatment fluids of the present invention containing viscosity-modifying polymers will usually approach or reach the ambient, elevated temperature of the subterranean formation being treated. The fractured formation typically contains many fractures and fissures (rather than being a single large cavity) that provide large surface area exposure of the fluid to the formation surface, enhancing heat transfer that promotes heating of the fluid in the subterranean deposit and, consequently, raising the effective operating temperature of the peracid also present in the fluid.

The peracetic acid and other peracids of the present invention are thus best suited for use in aqueous well treatment fluids employed in subterranean formations having ambient temperatures within the preferred temperature ranges noted above. However, the aqueous well treatment fluids of this invention can function effectively at ambient formation temperatures below the more preferred 50° C. minimum, since other parameters, e.g., pH or peracid concentration, can be adjusted to compensate for the lower operating temperature.

Exposure of the aqueous well treatment fluid to low ambient surface temperatures, e.g., below 30° C., is not critical, since the aqueous well treatment fluid becomes heated further as it is introduced into the subterranean oil- and gas-bearing formation at the latter's ambient temperature. A relatively low temperature of the aqueous well treatment fluid at the surface is actually advantageous and positive, in that the viscosity-reducing activity of the peracetic acid or other peracid is minimized at this point but is later enhanced by the fluid's being heated by the subterranean formation's elevated ambient temperature. This factor often provides additional time for the thickened well treatment fluid to serve its intended purpose, e.g., well formation fracturing, before the fluid viscosity-reducing functionality of the peracid in the well treatment fluid is fully effected.

Viscosity-Reduction—Reaction Times—Target Final Viscosities

The peracetic acid and other peracids of this invention have been found to provide controlled and effective viscosity-reducing functionality or activity in relatively short time periods, within a few hours rather than days, despite their being used at dilute concentrations in the aqueous well treatment fluids.

The peracetic acid and other peracids of this invention provide controlled viscosity-reduction that can be delayed for a few hours, e.g., about 1 to about 10 hours, preferably about 2 to about 5 hours, and then become more active at a later time point, e.g., achieving substantially complete viscosity reduction after about 10 hours, or even longer, e.g., at or after about 24 hours, all by suitable selection of pH, temperature, and like parameters. This delayed viscosity reduction control is consistent with the operational needs of the aqueous well treatment fluids containing viscosity-enhancing polymers and/or copolymers.

Such polymer- or copolymer-containing well treatment fluids are used to provide the viscosity-enhancing functionality over only a few hours after their initial introduction into the subterranean environment, e.g., between 1-10 hours with 2-5 hours being typical. After this short time period, the viscosity-enhancing functionality is no longer needed, e.g., once well formation fracturing is completed. At this point, the viscosity-reducing functionality provided by the peracids of this invention can then be used to effect a substantial fluid viscosity reduction.

In the case of thickened or partially gelled aqueous well treatment fluids, e.g., fracturing fluids containing crosslinked or partially crosslinked polymers or copolymers or other viscosity-enhancing polymers or copolymers, a substantial or significant viscosity reduction is desirable and necessary for efficient removal or recovery of the gas or oil product from the treated subterranean formation.

The fluid viscosity of the aqueous well treatment fluid is desirably reduced in such cases to less than about 100 cP, preferably less than about 30 cP, more preferably less than about 20 cP and most preferably less than about 10 cP. These viscosity reductions are based on the presumption that the initial aqueous well treatment fluid viscosity is well in excess of these stated reduced viscosity target values. Viscosity reductions that approach the viscosity of water containing no additives, about 1 cP, are highly desirable. Such viscosity reductions are achievable with the peracetic acid and peracid viscosity reducing agents of this invention.

In the case of aqueous fluid compositions that contain polymers or copolymers used to achieve flowing friction reduction, e.g., slick water fluids, the initial viscosity of such fluids is relatively low (in comparison to thickened fracturing fluids). Viscosity reductions with the peracids of this invention that achieve fluid viscosities that approach the viscosity of water containing no additives, about 1 cP, are preferred in such cases.

Peracids and Peracid Mixtures

Peracetic acid is the preferred peracid for use in the present invention, but other percarboxylic acids besides peracetic acid are also suitable for use in this invention.

A preferred category of suitable organic peracids includes peracids of a lower organic aliphatic monocarboxylic acid having 2-5 carbon atoms, such as acetic acid (ethanoic acid), propionic acid (propanoic acid), butyric acid (butanoic acid), iso-butyric acid (2-methyl-propanoic acid), valeric acid (pentanoic acid), 2-methyl-butanoic acid, iso-valeric acid (3-methyl-butanoic) and 2,2-dimethyl-propanoic acid. Organic aliphatic peracids having 2 or 3 carbon atoms, e.g., peracetic acid and peroxypropanoic acid, are most preferred for the present invention.

The peracids useful in this invention are preferably weak peracids having a dissociation constant (pKa) of about 7 or more, e.g., peracetic acid, pKa=8.2; perpropionic acid, pKa=8.1; and perbutanoic acid, pKa=8.2. Dissociation of such weak peracids may be effected at pH values above the pKa value of the peracid, which the inventors have unexpectedly found promotes activation of the peracid in a manner that makes such peracids highly efficacious for viscosity reduction in the present invention. This is accomplished through selection of preferred pH value ranges as noted earlier.

Peracetic acid may also be used in combination with other percarboxylic acids based on carboxylic acids other than the monocarboxylic $C_2$-$C_5$ peracids mentioned above, such as $C_2$-$C_5$ dicarboxylic peracids or $C_6$-$C_{12}$ monocarboxylic peracids. Peracetic acid is preferably the major component in such mixtures with higher percarboxylic acids, more preferably being at least about 80 wt % to about 90 wt % of the peracid mixtures.

Peracetic acid may be used in combination with preferred percarboxylic acids selected from the group consisting of peroctanoic acid, perglutaric acid, persuccinic acid, perdecanoic acid and mixtures thereof, to provide good antimicrobial activity in the presence of high organic loads. Peroctanoic acid is the most preferred percarboxylic acid for use in combination with peracetic acid.

Polymers Used in Commercial Well Fluids

The aqueous peracetic acid and other peracid viscosity reducing agents of the present invention are intended for use with polymer- or copolymer-containing aqueous well treatment fluids that are conventionally used in subterranean oil- and gas-field well operations, such as well drilling, formation fracturing, productivity enhancement, secondary recovery and the like. Such conventional aqueous well treatment fluids are characterized by containing one or more viscosity-modifying polymers or copolymers and typically may also contain other additives as well.

Conventional viscosity-modifying polymers and copolymers normally function as viscosity enhancers (as a thickener or gelling agent) but some polymers and copolymers may alternatively function as flowing friction reducers. This functionality, viscosity enhancement or flowing friction reduction, is often concentration dependent. As a general rule, higher concentrations of a (dual function) viscosity-modifying polymer/copolymer provide viscosity-enhancement in an aqueous well treatment fluid, but low concentrations of the same polymer/copolymer provide flowing friction-reduction functionality.

Viscosity Enhancers

Most of the viscosity-modifying polymers or copolymers used in conventional well treatment fluids function as viscosity-enhancers, serving to increase the fluid viscosity or promote a thickened or viscous or semi-gelled or gelled state in the aqueous well treatment fluid. Viscosity-enhancing polymeric agents are employed in amounts that provide viscosity-increasing functionality in the aqueous fluid.

Viscosity-enhancing polymers are typically used in amounts of about 0.01 to about 10 wt %, more preferably about 0.1 to about 5 wt %, based on the weight of the aqueous fluid. A viscosity-enhanced well fluid typically contains an amount of viscosity-enhancing polymer sufficient to provide a fluid viscosity in excess of 20 cP, more preferably an enhanced viscosity of at least about 50 cP or more.

The viscosity-modifying polymer may be any of known polymers or copolymers that are typically used in commercial well treatment aqueous fluid compositions. The polymers may be natural polymers, including modified forms of natural polymers, or synthetic polymers, including synthetic polymers and copolymers and their derivatives. The viscosity-modifying polymers are preferably water-soluble, at the concentrations employed in the aqueous well treatment fluids.

Viscosity-increasing polymers or copolymers are used to promote formation of a viscous or semi-gelled or gelled state in aqueous well treatment fluids. End use applications for such viscosity-enhancing well fluids include inhibition or control flow of water or formation gas and/or oil products flow into the well bore, as well as facilitating uniform dispersal or suspension of various solids used during well operations such as formation fracturing.

Use of such solids requires that the aqueous well fluid provide sufficient suspension of the solids to ensure that the solids are properly delivered to the site of the well bore or formation where their functionality is needed. Well fracturing procedures using proppants, e.g., inorganic solids like sand, silica, quartz, diatomaceous earth, in coated or uncoated form, require that these solids be suspended in the fluid, delivered and uniformly dispersed throughout the formation fractures by the well fluid during fracturing operations, so a viscous, thickened or partially gelled well fluid is usually employed.

Examples of viscosity-enhancing polymers that can serve to increase the fluid viscosity include synthetic polymers such as acrylamide-derived polymers and copolymers and acrylate-derived polymers and copolymers, often in crosslinked form.

Acrylamide-derived polymers and copolymers that can serve as viscosity-enhancing polymers include polyacrylamide, acrylamide-acrylate (acrylic acid) copolymers, acrylic acid-methacrylamide copolymers, partially hydrolyzed polyacrylamide copolymers (PHPA), partially hydrolyzed polymethacrylamides, acrylamide-methyl-propane sulfonate copolymers (AMPS) and the like.

Cross-linked acrylamide-based polymers that exhibit viscosity-enhancing functionality have been described in U.S. Pat. No. 4,995,461 of Sydansk (Marathon Oil) and in U.S. Pat. No. 5,268,112 of Hutchins et al. (Union Oil of California).

Examples of other viscosity-enhancing polymers (besides acrylamide-derived and acrylate-derived polymers and copolymers) that can serve to increase the fluid viscosity include natural and synthetic water-soluble polysaccharides, including guar and guar derivatives such as hydroxypropyl guar and carboxymethyl hydroxypropyl guar; xanthan and xanthan derivatives; alginates and alginate derivatives; carrageenan; cellulosic polymers and cellulosic derivatives such as hydroxyethylcellulose, hydroxypropylcellulose and carboxymethylhydroxyethylcellulose; and other biopolymers or synthetic polymers or copolymers that exhibit gelling or viscosity-enhancing functionality, and combinations of these.

These polymers may either be linear (non-crosslinked) or crosslinked, e.g., using cross-linking agents such as borate or zirconate or titanate in the case of polysaccharides like guar, or other known crosslinkers in the case of synthetic polymers and copolymers like acrylamide-derived polymers and copolymers.

Crosslinked polymers, such as crosslinked hydroxypropyl guar (HPG), provide the advantage of high fluid viscosities at lower usage rates, as compared with non-crosslinked or linear polymers/copolymers. Such crosslinked polymers can provide viscous fluid characteristics even at high fluid temperatures and are generally superior to linear polymers or copolymers in their proppant suspension capabilities.

Friction Reducers

As mentioned earlier, various polymers and copolymers may function or serve to reduce the flowing friction or reduce flow turbulence, to improve flow characteristics of the aqueous well treatment fluid. Such polymers are used in amounts that serve to provide flowing friction-reducing functionality in the aqueous fluid.

These flowing friction-reducing polymers are typically used in relatively small amounts of about 0.01 to about 1 wt %, more preferably about 0.05 to about 0.5 wt %, based on the weight of the aqueous fluid. A friction-reduced well fluid typically contains an amount of flowing friction-reducing polymer sufficient to provide a fluid viscosity of about 10 centipoise (cP) or less, preferably less than about 5 cP (pure water has a viscosity of about 1 cP). The peracetic acid and other peracids of this invention are well suited for reducing the fluid viscosity or otherwise degrading the friction-reducing polymers or copolymers, so as to enhance or improve the subsequent gas- or oil-product recovery efficiencies.

Examples of viscosity-reducing polymers that can serve as friction reducers include acrylamide-derived polymers and copolymers, such as polyacrylamide (sometime abbreviated as PAM), acrylamide-acrylate (acrylic acid) copolymers, acrylic acid-methacrylamide copolymers, partially hydrolyzed polyacrylamide copolymers (PHPA), partially hydrolyzed polymethacrylamides, acrylamide-methyl-propane sulfonate copolymers (AMPS) and the like. Various derivatives of such polymers and copolymers, e.g., quaternary amine salts, hydrolyzed versions, and the like, should be understood to be included with the polymer and copolymer categories defined in this specification.

Examples of commercial acrylamide-based polymer products that have friction-reducing functionality include New-Drill® products (Baker Hughes, Houston, Tex.), FRW-15 friction reducer (BJ Services, Houston, Tex.), and FR-56™ friction reducer (Halliburton, Houston, Tex.). Acrylamide-based polymers and copolymers have also been described in the patent literature for use as friction reducers in oil-field applications such as well fracturing, e.g., U.S. Pat. No. 3,254,719 of Root (Dow Chemical) and U.S. Pat. No. 4,152,274 of Phillips et al. (Nalco Chemical).

Examples of other viscosity-reducing polymers (besides acrylamide-derived polymers and copolymers) that can serve as friction reducers include guar and guar derivatives, acrylate-derived polymers and copolymers like polymethylmethacrylate, ethylene oxide-derived polymers like polyethyleneoxide, alkoxylated alkanolamides, and other biopolymers or synthetic polymers or copolymers that exhibit viscosity-reducing or friction-reducing functionality, and combinations of these.

The so-called slick water well treatment fluids are used for formation fracturing and are typical water containing one or more friction reducers. Slick water well treatment fluids are introduced at very high flow rates into the region of an oil- or gas-bearing formation to fracture the formation, thereby enhancing petroleum product recovery. Slick water fluid compositions typically are water that contains a friction-reducing polymer and other additives such as a scale preventer and biocide. The preferred friction-reducing polymers in slick water fluids are polyacrylamide or other acrylamide-derived polymers or copolymers, which improve the flow characteristics of the slick water fluid.

The peracetic acid of this invention is well suited for providing viscosity-reducing functionality to slick water well treatment fluids, since after the well formation is fractured by slick water fluids, the presence of slick water polymers may interfere with subsequent oil/gas production (removal) from the fractured well formation.

Other Fluid Additives/"Fluid"

The aqueous well treatment fluids employed in the present invention may contain other components or additives besides the viscosity-enhancing polymer or copolymers and the peracetic acid or other peracid viscosity reducers (breaking agents) of this invention. Such other components or additives may include emulsifiers, anti-scale agents, surfactants, proppants, antifoaming or foaming agents, storage stabilizers and other like components that may be used in conventional aqueous well treatment fluids.

The inventors have unexpectedly discovered that potassium salts, e.g., potassium chloride (KCl) which is often used as an additive in aqueous well treatment fluids to promote fluid compatibility with subterranean formations comprising sandstone, are particularly useful for enhancing the viscosity-reducing activity of peracetic acid in the present invention. Potassium salts in amounts of about 0.5 wt % to about 5 wt %, based on the weight of the aqueous fluid composition, provide enhanced viscosity-reducing activity when present concurrently with the peracetic acid, with about 2 wt % KCl being especially preferred.

The peracids of this invention, in particular the preferred peracetic acid, are generally compatible with the various other chemical and non-chemical additives that are also present in aqueous well treatment fluids that contain viscosity-enhancing or viscosity-modifying polymers or copolymers. In addition, the peracetic acid and other peracids of this invention are economical to use, since relatively dilute concentrations provide excellent viscosity-reducing activity, an important consideration in well treatment operations where huge volumes (millions of gallons) of the aqueous well treatment fluids are employed.

The term fluid as used in reference to the term well treatment fluid employed in this invention should be understood to refer to an aqueous medium that may be an aqueous solution, an aqueous suspension (aqueous medium with solids and/or gas), a thickened or partially gelled but pumpable aqueous medium, or like fluid that can be introduced via a well bore hole to a subterranean formation.

The aqueous medium used in the preparation of the aqueous well treatment fluid containing a viscosity-modifying polymer is normally water. The water source may be a freshwater source, salt water or brine source, brackish water source, recycled water source, or the like. Offshore well drilling operations typically employ seawater, which can be either saltwater or freshwater. Since extremely large volumes of water are typically required in well fluid operations, economic constraints often dictate the use of recycled water, brine water or non-potable water sources.

EXAMPLES

The following non-limiting Examples illustrate preferred embodiments of the present invention. Examples 1 and 2 demonstrate the viscosity-modifying effect of peracetic acid on aqueous fluids containing guar as the thickening agent. Examples 3 and 4 demonstrate the viscosity-modifying effect of peracetic acid on aqueous fluids containing an acrylamide-derived copolymer as the thickening agent. Example 5 demonstrates the viscosity-reducing effect of peracetic acid on aqueous fluids containing a crosslinked hydroxypropyl guar as the thickening agent.

Example 1

Example 1 illustrates studies of the impact of pH on the viscosity-modifying effectiveness of peracetic acid in treating a viscous aqueous fluid containing guar as the viscosity-increasing agent. Two concentrations of peracetic acid were evaluated, a moderate dosage of 75 mg/l (ppm) and a low dosage of 7.5 mg/l (ppm), at two treatment temperatures, 40° C. and 60° C. The effects of these peracetic acid treatments were measured at 3 hours after treatment (post-treatment) and 24 hours after treatment, with the fluids being maintained at the treatment temperature (in this Example 1 and in subsequent Examples). The 3 hour measurement point was selected as representative of a minimum time for the viscosity-enhancing polymer to remain effective, after which the peracetic acid should desirably effect a substantial viscosity reduction.

It should be noted that Example 1 and the other Examples represent stringent temperature test conditions, since a constant treatment temperature was utilized. In typical actual well treatment operations, the aqueous well treatment fluid temperature would initially be a lower temperature (at the surface) and only after being pumped into the subterranean well formation would the fluid be heated to a higher treatment temperature (approaching or equal to the subterranean deposit ambient temperature).

The procedure used to prepare the aqueous fluid used in these studies was as follows. The aqueous fluid was intended to simulate a well treatment fluid and contained 7.2 g (0.72 wt %) linear guar (Sigma-Aldrich), 0.25 ml acetic acid and 20 g KCl per liter Milli-Q deionized water. The initial fluid viscosity (at 40° C.) was 238 centipoise (cP); it should be noted that pure water has a viscosity of about 1 cP (at 20° C.). Fluid pH was adjusted with aqueous HCl and aqueous NaOH to obtain the desired pH value.

The peracetic acid used in this Example 1 was Peracetic Acid 15/23 (FMC Corporation, Philadelphia, Pa.), an equilibrated aqueous peracetic acid solution containing about 15 wt % peracetic acid, about 23 wt % hydrogen peroxide and about 16 wt % acetic acid. Sufficient peracetic acid was introduced in the aqueous fluid in each of the studies to provide the desired concentration, either 75 ppm peracetic acid or 7.5 ppm peracetic acid.

The fluid viscosity was measured at the treatment temperature, either 40° C. or 60° C., in a Brookfield PVS viscometer (Brookfield Engineering Laboratories, Inc., Middleboro, Mass.) with a B5 bob, at a shear rate of 100 $sec^{-1}$ at atmospheric pressure; readings are reported in centipoise (cP).

These fluids were non-Newtonian and their viscosity was dependent on shear rate, and for this reason the shear rate used for viscosity measurements is noted above.

Viscosity measurements were taken at post-treatment times of 3 hours and 24 hours, as indicated in the Tables 1 and 2 below. The viscosities of control samples containing no added peracetic acid were also measured for baseline purposes, also as shown in Tables 1 and 2.

In the first study, the effect of 75 ppm peracetic acid on fluid viscosity was evaluated at a temperature of 40° C. on the viscous aqueous fluid containing 0.72 wt % guar over the pH range of 2.5 to 10, with viscosity measurements being taken on the treated fluid at 3 hours and 24 hours post-treatment.

Results of the studies are shown below in Table 1; the term "PAA" in the Table refers to peracetic acid.

TABLE 1

Moderate Dosage Peracetic Acid (15/23) Effect on
Viscosity of Guar-containing Aqueous Fluid at 40° C.

| | Time | | | |
|---|---|---|---|---|
| | 3 hours Viscosity, cP | | 24 hours Viscosity, cP | |
| pH Value | No PAA | 75 ppm PAA | No PAA | 75 ppm PAA |
| 2.5 | 153 | 168 | 117 | 112 |
| 4 | 171 | 174 | 133 | 95 |
| 7 | 172 | 146 | 156 | 39 |
| 8 | 174 | 114 | 155 | 18 |
| 9 | 174 | 59 | 156 | 3 |
| 10 | 174 | 22 | 157 | ~1 |

The results in Table 1, for a peracetic treatment dosage of 75 ppm at 40° C., show that peracetic acid activity in reducing fluid viscosity was progressively greater as the fluid pH became more alkaline, with good controlled viscosity reduction being demonstrated at pH values of 7-8. The data indicate that peracetic acid activity in reducing fluid viscosity provided the most effective control at pH 7 and 8, where the fluid viscosity at 3 hours post-treatment was still significant but was reduced substantially at 24 hours post-treatment.

The data in Table 1 also show that, without any peracetic acid treatment ("No PAA" data), the viscosity of the aqueous fluid was sensitive to acidic pH values at 40° C., exhibiting a slight decline in fluid viscosity at pH 2.5 after three hours and even more of a decline after 24 hours at both pH 2.5 and pH 4. These results are consistent with the fact that guar-thickened fluids are known to be unstable at acidic pH values.

In a second study in Example 1, a lower concentration of peracetic acid was evaluated, namely, 7.5 ppm instead of 75 ppm used previously, and the treatment temperature was increased to 60° C., compared to 40° C. used previously. As before, the effect of the peracetic on fluid viscosity was evaluated on the viscous aqueous fluid containing 0.72 wt % guar over the pH range of 2.5 to 10, with viscosity measurements being taken on the treated fluid at 3 hours and 24 hours post-treatment.

Results are shown below in Table 2.

TABLE 2

Low Dosage Peracetic Acid (15/23) Effect on
Viscosity of Guar-containing Aqueous Fluid at 60° C.

| | Time | | | |
|---|---|---|---|---|
| | 3 hours Viscosity, cP | | 24 hours Viscosity, cP | |
| pH values | No PAA | 7.5 ppm PAA | No PAA | 7.5 ppm PAA |
| 2.5 | 92 | 59 | 36 | 9 |
| 4 | 126 | 46 | 76 | 7 |
| 7 | 131 | 77 | 125 | 24 |
| 8 | 138 | 70 | 126 | 18 |
| 9 | 132 | 43 | 124 | 10 |
| 10 | 122 | 14 | 104 | 7 |

The results in Table 2, for a peracetic treatment dosage of 7.5 ppm at 60° C., show that peracetic acid activity in reducing fluid viscosity was progressively greater as the fluid pH became more alkaline, with good controlled viscosity reduction again being provided at pH values of 7-8. The viscosity reduction of the aqueous fluid was only moderate at pH 7-8 at 3 hours post-treatment, but was substantial at 24 hours post-treatment.

The data in Table 2 show that, without any peracetic acid treatment ("No PAA" data), the viscosity of the aqueous fluid was sensitive to acidic pH values and, in addition, to the higher temperature used (60° C. vs. 40° C. previously). This sensitivity was much more pronounced at the 60° C. temperature used, with the fluid viscosity declining at pH 2.5 after three hours and exhibiting a significant decline at both pH 2.5 and 4 after 24 hours.

For comparative purposes, additional studies were conducted to evaluate the impact of a moderate dosage of hydrogen peroxide in treating a viscous aqueous fluid containing guar as the viscosity-increasing agent. No peracetic acid was used in conjunction with the hydrogen peroxide employed in these comparative studies.

A single dosage concentration of hydrogen peroxide, 115 mg/l (ppm) $H_2O_2$ was used in the comparative study. This concentration of hydrogen peroxide was selected since 75 ppm peracetic acid (obtained from 15/23 peracetic acid used in this Example 1) also carries with it 115 ppm $H_2O_2$.

Two temperatures, 40° C. and 60° C., and two pH values, pH 4 and pH 10, were used in evaluating the effect of this single dosage of hydrogen peroxide. The effect of the hydrogen peroxide treatment was measured at 3 hours and 24 hours after treatment.

The viscous aqueous fluid used in this comparative study was the same as that used previously in Example 1 for the peracetic acid studies and contained guar as the viscosity-enhancing agent. The aqueous fluid contained 7.2 g (0.72 wt %) linear guar (Sigma-Aldrich) and 20 g KCl per liter Milli-Q deionized water. Fluid pH was adjusted with aqueous HCl and aqueous NaOH to obtain the desired pH value.

Results of the hydrogen peroxide treatment studies are shown below in Table 3; in the Table, the term "Control" refers to untreated fluid.

TABLE 3

Moderate Dosage Hydrogen Peroxide Effect on Viscosity of
Guar-containing Aqueous Fluid at 40° C. and 60° C. and at
pH 4 and pH 10

| | | | Time | |
|---|---|---|---|---|
| Fluid | Temperature, ° C. | pH value | 3 hours Viscosity, cP | 24 hours Viscosity, cP |
| Control | 40 | 4 | — | 169 |
| H$_2$O$_2$-treated sample | 40 | 4 | — | 60 |
| Control | 40 | 10 | 177 | 153 |
| H$_2$O$_2$-treated sample | 40 | 10 | 119 | 7 |
| Control | 60 | 4 | 135 | 74 |
| H$_2$O$_2$-treated sample | 60 | 4 | 119 | 8 |
| Control | 60 | 10 | 134 | 109 |
| H$_2$O$_2$-treated sample | 60 | 10 | 21 | ~1 |

The results in Table 3 show that the addition of 115 ppm hydrogen peroxide to the guar-containing viscous fluid resulted in a decrease of fluid viscosity. The activity of the hydrogen peroxide was increased by the temperature increase from 40° C. to 60° C., by increased contact time from 3 to 24 hours, and by the change in pH value from pH 4 to pH 10. The viscosity of the aqueous fluid was reduced with 115 ppm hydrogen peroxide to less than 10 cP at pH values of 4 and 10, at 24 hours post-treatment.

However, equivalent viscosity reduction performance at 60° C. was also obtained with only 7.5 ppm peracetic acid (as shown in Table 2), which also contained just 11 ppm H$_2$O$_2$ ($^1$/$_{10}$ the amount used in the comparative study), indicating the superior performance of peracetic acid on a dosage rate basis.

Example 2

Example 2 illustrates additional studies of the impact of pH on the viscosity-modifying effectiveness of peracetic acid in treating a viscous aqueous fluid containing guar as the viscosity-increasing agent. Two concentrations of peracetic acid were evaluated, 75 mg/L (ppm) and 7.5 mg/L (ppm) (both as in Example 1), at a treatment temperature of 50° C. The effects of these peracetic acid treatments were measured at 3 hours after treatment and 24 hours after treatment.

The aqueous fluid used in this Example 2 was identical to that used in Example 1 and contained 0.72 wt % linear guar and 2 wt % KCl in deionized water. As in Example 1, fluid pH was adjusted with aqueous HCl and aqueous NaOH to obtain the desired pH value. Viscosity measurements were taken as described in Example 1.

The 15 wt % peracetic acid used in this Example 2 was a different grade of peracetic acid, containing only 10 wt % H$_2$O$_2$ (compared to 23 wt % H$_2$O$_2$ in the 15% peracetic acid of Example 1): Peracetic Acid 15/10 (FMC Corporation, Philadelphia, Pa.), an equilibrated aqueous peracetic acid solution containing about 15 wt % peracetic acid, about 10 wt % hydrogen peroxide and about 36 wt % acetic acid. Sufficient peracetic acid was introduced in the aqueous fluid in each of the studies of this Example 2 to provide the desired concentration, either 75 ppm peracetic acid or 7.5 ppm peracetic acid.

In the first study of this Example 2, the effect of 7.5 ppm peracetic acid on fluid viscosity was evaluated at a temperature of 50° C. on the viscous aqueous fluid containing 0.72 wt % guar over the pH range of 2.5 to 10, with viscosity measurements being taken on the treated fluid at 3 hours and 24 hours post-treatment.

Results of the studies are shown below in Table 4.

TABLE 4

Low Dosage Peracetic Acid (15/10) Effect on
Viscosity of Guar-containing Aqueous Fluid at 50° C.

| | Time | | | |
|---|---|---|---|---|
| | 3 hours Viscosity, cP | | 24 hours Viscosity, cP | |
| pH Values | no PAA | 7.5 ppm PAA | no PAA | 7.5 ppm PAA |
| 2.5 | 129 | 117 | 57 | 30 |
| 4 | 152 | 126 | 90 | 48 |
| 6 | 144 | 142 | 117 | 97 |
| 8 | 150 | 146 | 109 | 106 |
| 10 | 147 | 128 | 107 | 92 |

The data in Table 4 show that, without any peracetic acid treatment ("No PAA" data), the viscosity of the aqueous fluid was sensitive to acidic pH values at 50° C., exhibiting a slight decline in fluid viscosity at pH 2.5 after three hours and a decline that was significant after 24 hours at both pH 2.5 and pH 4.

The results in Table 4, for the relatively low peracetic treatment dosage of 7.5 ppm at 50° C., show that the viscosity-reducing activity of the peracetic acid was only fair, at pH values of 6, 8 and 10. Viscosity reduction control was good since no significant decline in fluid viscosity was observed at 3 hours post-treatment, but viscosity reduction effected at 24 hours post-treatment was only moderate.

The data in Table 4, when compared to that obtained in Table 2 of Example 1, suggest that peracetic acid activity in reducing fluid viscosity at the low dosage employed, i.e., 7.5 ppm peracetic acid, was enhanced by the presence of the increased amount of hydrogen peroxide in the 15% peracetic acid solution of Example 1 (23 wt % H$_2$O$_2$ in Example 1 vs. 10 wt % H$_2$O$_2$ in Example 2).

In the second study in Example 2, a higher concentration of peracetic acid was evaluated, namely, 75 ppm instead of 7.5 ppm used in the first study, with all other factors being the same as in the first study of this Example 2. As before, the effect of the peracetic on fluid viscosity was evaluated on the viscous aqueous fluid containing 0.72 wt % guar over the pH range of 2.5 to 10, with viscosity measurements being taken on the treated fluid at 3 hours and 24 hours post-treatment.

Results are shown below in Table 5.

TABLE 5

Moderate Dosage Peracetic Acid (15/10) Effect on
Viscosity of Guar-containing Aqueous Fluid at 50° C.

| | Time | | | |
|---|---|---|---|---|
| pH | 3 hours Viscosity, cP | | 24 hours Viscosity, cP | |
| Values | no PAA | 75 ppm PAA | no PAA | 75 ppm PAA |
| 2.5 | 131 | 131 | 47 | 37 |
| 4 | 148 | 135 | 107 | 61 |
| 6 | 149 | 133 | 115 | 70 |
| 8 | 151 | 128 | 126 | 70 |
| 10 | 152 | 70 | 115 | 39 |

The results in Table 5, for a peracetic treatment dosage of 75 ppm at a temperature of 50° C., show trends similar to those observed for the results in Table 4 which used a lower peracetic acid dosage of 7.5 ppm, but viscosity reduction control was improved at the higher peracetic acid dosage used here, particularly at pH values of 6 and 8.

The peracetic acid control in reducing fluid viscosity was best at pH values of 6 and 8, where no significant decline in fluid viscosity was observed at 3 hours post-treatment, but fluid viscosity was reduced to 70 cP at 24 hours post-treatment.

The data in Table 5, when compared to that obtained in Table 1 of Example 1, again suggest that peracetic acid activity in reducing fluid viscosity is enhanced by the presence of the increased amount of hydrogen peroxide in the 15% peracetic acid solution of Example 1 (23 wt % $H_2O_2$ in Example 1 vs. 10 wt % $H_2O_2$ in Example 2).

Example 3

Example 3 illustrates studies of the impact of pH on the viscosity-modifying effectiveness of peracetic acid in treating a viscous aqueous fluid containing a polyacrylamide derivative as a viscosity-modifying agent, i.e., as a fluid friction reducer. Two concentrations of peracetic acid were evaluated, 7.5 mg/L (ppm) and 75 mg/L (ppm), at two treatment temperatures, 50° C. and 100° C. The effects of these peracetic acid treatments were measured at 3 hours after treatment and 24 hours after treatment.

The procedure used to prepare the aqueous fluid used in these studies was as follows. The aqueous fluid was intended to simulate a well treatment slick water fluid and contained 0.05 wt % ASP®-820 latex (containing acrylamidomethyl propane sulfonate copolymer), prepared by mixing 0.5 g ASP®-820 latex per liter of Milli-Q deionized water in a Waring® blender. ASP®-820 is a multipurpose friction reducer obtained from Nalco Energy Services, LLP (Sugar Land, Tex.). Fluid pH was adjusted with aqueous HCl and aqueous NaOH to obtain the desired pH value.

The fluid viscosity was measured at 25° C. in an Ubbelohde viscometer. Viscosity measurements are reported in seconds, and these time measurements are proportional to the viscosity of the fluid. The proportionality constant for the studies in this Example 3 was 0.00898 cP/sec (manufacturer's data) using a size no. 1 Ubbelohde viscometer.

The peracetic acid used in this Example 3 was Peracetic Acid 15/10 (FMC Corporation, Philadelphia, Pa.), an equilibrated aqueous peracetic acid solution containing about 15 wt % peracetic acid, about 10 wt % hydrogen peroxide and about 36 wt % acetic acid. Sufficient peracetic acid was introduced in the aqueous fluid in each of the studies to provide the desired concentration, either 7.5 ppm peracetic acid or 75 ppm peracetic acid.

In a first study of this Example 3, the effect of 7.5 ppm peracetic acid on fluid viscosity was evaluated at a temperature of 50° C. on the viscous aqueous fluid containing 0.05 wt % ASP-820 copolymer latex over the pH range of 2.5 to 10, with viscosity measurements being taken on the treated fluid at 3 hours and 24 hours post-treatment.

Results of the study are shown below in Table 6; in this and subsequent Tables, the term "PAA" refers to peracetic acid. Viscosity results are reported here as apparent viscosities, in seconds.

TABLE 6

Low Dosage Peracetic Acid (15/10) Effect on Viscosity of ASP 820-containing Aqueous Fluid at 50° C.

| | Time | | | |
|---|---|---|---|---|
| | 3 hrs Apparent Viscosity, seconds | | 24 hrs Apparent Viscosity, seconds | |
| pH value | no PAA | 7.5 ppm PAA | no PAA | 7.5 ppm PAA |
| 2.5 | 159 | 174 | 177 | 138 |
| 4 | 216 | 230 | 235 | 213 |
| 6 | 270 | 222 | 281 | 108 |
| 8 | 259 | 236 | 259 | 149 |
| 10 | 237 | 195 | 238 | 156 |

The results in Table 6, for a peracetic treatment dosage of 7.5 ppm at 50° C., show that the low dosage of peracetic acid provided good controlled friction-reducing activity at pH values of 6, 8 and 10 but that the decrease in viscosity of the fluid at 24 hours post-treatment was only moderate. The best controlled viscosity reduction was obtained at pH 6.

The data in Table 6 also show that, without any peracetic acid treatment ("No PAA" data), the viscosity of the aqueous fluid was generally insensitive to alkaline pH values at 50° C. but was adversely affected at the acidic pH values.

In a second study in this Example 3, a higher concentration of peracetic acid was evaluated, namely, 75 ppm instead of 7.5 ppm used previously, and the treatment temperature was maintained at 50° C. As before, the effect of the peracetic on fluid viscosity was evaluated on the viscous aqueous fluid containing 0.05 wt % ASP-820 copolymer latex over the pH range of 2.5 to 10, with viscosity measurements being taken on the treated fluid at 3 hours and 24 hours post-treatment.

Results are shown below in Table 7. Viscosity results are reported here as apparent viscosities, in seconds.

TABLE 7

Moderate Dosage Peracetic Acid (15/10) Effect on Viscosity of ASP 820-containing Aqueous Fluid at 50° C.

| | Time | | | |
|---|---|---|---|---|
| | 3 hrs Apparent Viscosity, seconds | | 24 hrs Apparent Viscosity, seconds | |
| pH value | no PAA | 75 ppm PAA | no PAA | 75 ppm PAA |
| 2.5 | 159 | 148 | 168 | 125 |
| 4 | 234 | 230 | 281 | 158 |
| 6 | 262 | 170 | 281 | 96 |
| 8 | 220 | 111 | 223 | 93 |
| 10 | 221 | 117 | 220 | 97 |

The results in Table 7, for a peracetic treatment dosage of 75 ppm at a temperature of 50° C., show that peracetic acid provided good controlled viscosity-reducing activity at alkaline pH values. The best controlled viscosity reduction was observed at pH 6, with only modest fluid viscosity reduction at 3 hours post-treatment but significant viscosity reduction at 24 hours post-treatment. At pH 8 and 10, the viscosity reduction at 3 hours post-treatment was greater than that at pH 6, with final viscosities at 24 hours post-treatment being the same for pH 6, 8 and 10.

In the next two studies of this Example 3, the effect of peracetic acid on fluid viscosity was evaluated at a temperature of 100° C., rather than at 50° C. as previously. The third and fourth studies of this Example 3 utilized peracetic acid concentrations of 7.5 ppm and 75 ppm, respectively.

As before, the effect of the peracetic acid on fluid viscosity was evaluated on the viscous aqueous fluid containing 0.05 wt % ASP-820 copolymer latex over the pH range of 2.5 to 10, with viscosity measurements being taken on the treated fluid at 3 hours and 24 hours post-treatment.

Results of third study using 7.5 ppm peracetic acid at a treatment temperature of 100° C. are shown below in Table 8. Results of fourth study using 75 ppm peracetic acid at a treatment temperature of 100° C. are shown further below in Table 9. Since the results in these two studies were similar they are reported and discussed together. Viscosity results are reported here as apparent viscosities, in seconds.

TABLE 8

Low Dosage Peracetic Acid (15/10) Effect on Viscosity of ASP 820-containing Aqueous Fluid at 100° C.

| | Time | | | |
|---|---|---|---|---|
| | 3 hrs Apparent Viscosity, seconds | | 24 hrs Apparent Viscosity, seconds | |
| pH value | no PAA | 7.5 ppm PAA | no PAA | 7.5 ppm PAA |
| 2.5 | 133 | 85 | 106 | 79 |
| 4 | 148 | 86 | 216 | 79 |
| 6 | 188 | 80 | 332 | 79 |
| 8 | 163 | 82 | 109 | 80 |
| 10 | 141 | 82 | 187 | 80 |

TABLE 9

Moderate Dosage Peracetic Acid (15/10) Effect on Viscosity of ASP 820-containing Aqueous Fluid at 100° C.

| | Time | | | |
|---|---|---|---|---|
| | 3 hrs Apparent Viscosity, seconds | | 24 hrs Apparent Viscosity, seconds | |
| pH value | no PAA | 75 ppm PAA | no PAA | 75 ppm PAA |
| 2.5 | 133 | 81 | 106 | 79 |
| 4 | 148 | 80 | 216 | 79 |
| 6 | 188 | 79 | 332 | 79 |
| 8 | 163 | 79 | 109 | 79 |
| 10 | 141 | 79 | 187 | 79 |

The results in Tables 8 and 9, for respective peracetic treatment dosages of 7.5 of 75 ppm at a temperature of 100° C., show that peracetic acid activity in reducing fluid viscosity was uniformly strong at both dosages and at all pH vales studied, not only at 24 hours but also at 3 hours post-treatment. There was no demonstrated controlled viscosity reduction at three hours post-treatment, since the high treatment temperature accelerated the activity of peracetic acid, leading to a significant loss of fluid viscosity at 3 hours post-treatment, essentially the same as that obtained at 24 hours post-treatment.

These results at a treatment temperature of 100° C. contrast with the positive results obtained at 50° C., where controlled viscosity reduction was obtained at pH values of 6, 8 and 10 for the peracetic acid dosage of 75 ppm, as shown in Table 7.

For comparative purposes, additional studies were conducted to evaluate the impact of a moderate dosage of hydrogen peroxide in treating the identical aqueous fluid containing 0.05 wt % ASP-820 copolymer latex used earlier in this Example 3. No peracetic acid was used in conjunction with the hydrogen peroxide employed in these comparative studies.

A single dosage concentration of 100 ppm $H_2O_2$ was used in the comparative study. This concentration of hydrogen peroxide was selected as an approximation of $H_2O_2$ content of 75 ppm peracetic acid obtained from 15/23 peracetic acid (used in Example 1), which carries with it 115 ppm $H_2O_2$.

Two temperatures, 50° C. and 100° C., and a pH range of 2.5 to 10, were again used in this hydrogen peroxide comparative study, with fluid pH again being adjusted with aqueous HCl and aqueous NaOH to obtain the desired pH value. Viscosity was measured as described previously for both peracetic acid-treated and untreated fluid at 3 hours and 24 hours post-treatment.

Results of the 100 ppm hydrogen peroxide treatment studies are shown below in Tables 10 (treatment temperature 50° C.) and 11 (treatment temperature 100° C.); in the Tables, the term "Control" refers to untreated fluid. Viscosity results are reported here as apparent viscosities, in seconds.

TABLE 10

Moderate Dosage Hydrogen Peroxide Effect on Viscosity of ASP 820-containing Aqueous Fluid at 50° C.

| | Time | | | |
|---|---|---|---|---|
| | 3 hrs Apparent Viscosity, seconds | | 24 hrs Apparent Viscosity, seconds | |
| pH value | control | $H_2O_2$-treated sample | control | $H_2O_2$-treated sample |
| 2.5 | 159 | 143 | 177 | 150 |
| 4 | 216 | 200 | 235 | 170 |
| 6 | 270 | 205 | 281 | 197 |
| 8 | 259 | 175 | 259 | 180 |
| 10 | 237 | 96 | 238 | 88 |

TABLE 11

Moderate Dosage Hydrogen Peroxide Effect on Viscosity of ASP 820-containing Aqueous Fluid at 100° C.

| | Time | | | |
|---|---|---|---|---|
| | 3 hrs Apparent Viscosity, seconds | | 24 hrs Apparent Viscosity, seconds | |
| pH value | control | $H_2O_2$-treated sample | control | $H_2O_2$-treated sample |
| 2.5 | 133 | 82 | 106 | 78 |
| 4 | 148 | 87 | 216 | 78 |
| 6 | 188 | 86 | 332 | 79 |
| 8 | 163 | 80 | 109 | 78 |
| 10 | 141 | 78 | 187 | 78 |

The results in Tables 10 and 11 show that the addition of 100 ppm hydrogen peroxide to the ASP-820 copolymer latex-containing fluid resulted in a decrease of fluid viscosity. At the lower temperature of 50° C. (Table 10), activity of the hydrogen peroxide time was about the same 3 hours after treatment as at 24 hours after treatment, indicating rapid reactivity with essentially no controlled viscosity reduction.

At the higher temperature of 100° C. (Table 11), the activity of the same dosage (100 ppm) of hydrogen peroxide was significantly increased, with essentially the same fluid viscosity reduction being the same at 3 hours post-treatment as at 24 hours post-treatment and again indicating rapid reactivity with essentially no controlled viscosity reduction.

Example 4

Example 4 illustrates screening studies of various peracetic acid treatments on modifying the viscosity of aqueous fluids containing another polyacrylamide derivative as a viscosity-modifying agent, i.e., an acrylamide-acrylic acid copolymer viscosity enhancer. Three concentrations of peracetic acid were evaluated, 7.5 ppm, and 75 ppm and 750 ppm, at a treatment temperature of 60° C. The effects of these peracetic acid treatments were measured at 3 hours after treatment and 24 hours after treatment.

The aqueous fluid used in this study was intended to simulate a well treatment fluid and contained 4 g copolymer of acrylamide and acrylic acid (molecular weight: ~5,000,000; source: Sigma-Aldrich) per liter of Milli-Q deionized water.

The fluid viscosity was measured at 25° C. in an Ubbelohde viscometer, and measurements are again reported in centipoise. For the 3 hour viscosity measurements, a Ubbelohde viscometer size no. 1C was used (manufacturer's constant of 0.02870 cP/sec), and for the 24 hour viscosity measurements a Ubbelohde viscometer size no. 1 was used (manufacturer's constant of 0.00898 cP/sec). A control sample containing no added peracetic acid was also measured, as a baseline. The pH of this baseline sample was about 5.2.

The peracetic acid used for the fluid treatment in this Example 4 was Peracetic Acid 15/10 (FMC Corporation, Philadelphia, Pa.), an equilibrated aqueous peracetic acid solution containing about 15 wt % peracetic acid, about 10 wt % hydrogen peroxide and about 36 wt % acetic acid. Sufficient peracetic acid was introduced in the aqueous fluid in each of the studies to provide the desired concentration, 7.5 ppm, 75 ppm or 750 ppm peracetic acid.

Additional 75 ppm peracetic acid treatment samples were also included in this screening to evaluate the effect of additives, e.g., 2 wt % KCl and 2 drops NaOH, used in conjunction with the peracetic acid.

Results of the screening studies are shown below in Table 12.

For comparative purposes, additional studies were carried out with various additives but without peracetic acid addition to evaluate their effect on fluid viscosity of the aqueous fluid containing 0.4 wt % acrylamide-acrylic acid copolymer, at a temperature of 60° C. These additives (no peracetic acid addition) were as follows: 2 wt % KCl
2 wt % KCl+70 ppm hydrogen peroxide
2 wt % KCl+350 ppm hydrogen peroxide
2 wt % KCl+600 ppm ammonium persulfate
Results of these comparative screening studies are summarized at the bottom of Table 12 below.

TABLE 12

Peracetic Acid (15/10) Effect on Viscosity of Acrylamide - Acrylic Acid Copolymer-containing Aqueous Fluid at 60° C.

| Fluid Treatment | Viscosity, cP | |
| --- | --- | --- |
| | 3 hours | 24 hours |
| No Peracetic Acid | 4.9 | 3.6 |
| 7.5 ppm Peracetic Acid | 4.9 | 3.3 |
| 75 ppm Peracetic Acid | 4.0 | 1.2 |
| 750 ppm Peracetic Acid | 4.1 | 1.4 |
| 75 ppm Peracetic Acid + 2% KCl | 2.2 | 1.2 |
| 2% KCl (no peracetic acid) | 3.4 | 2.7 |

TABLE 12-continued

Peracetic Acid (15/10) Effect on Viscosity of Acrylamide - Acrylic Acid Copolymer-containing Aqueous Fluid at 60° C.

| Fluid Treatment | Viscosity, cP | |
| --- | --- | --- |
| | 3 hours | 24 hours |
| 75 ppm Peracetic Acid + 2 drops NaOH | 4.2 | 1.3 |
| 2% KCl + 70 ppm Hydrogen Peroxide | 3.4 | 2.2 |
| 2% KCl + 350 ppm Hydrogen Peroxide | 1.0 | 0.7 |
| 2% KCl + 600 ppm Ammonium Persulfate | 2.2 | 0.8 |

This study of the effects of peracetic acid concentration on fluid viscosity of an aqueous fluid containing 0.4 wt % acrylamide-acrylic acid copolymer at 60° C. showed excellent viscosity reduction control at all three dosages used, with no significant viscosity decline at 3 hours post-treatment. At the lowest peracetic acid dosage of 7.5 ppm, moderate fluid viscosity reduction was observed at 24 hours post-treatment. At the two higher dosages, 75 ppm and 750 ppm, substantial fluid viscosity reduction was achieved at 24 hours post-treatment.

Introduction of the 2 wt % KCl additive to the 75 ppm peracetic acid dosage provided good viscosity reduction control and a significant fluid viscosity reduction at 24 hours post-treatment, but with moderate viscosity decline being observed at 3 hours post-treatment.

Introduction of 2 drops NaOH additive to the 75 ppm peracetic acid dosage provided slightly improved viscosity reduction control, as compared to the fluid treatment with 75 ppm peracetic acid alone (no alkaline pH adjustment), since there was no significant viscosity decline at 3 hours post-treatment but substantial viscosity reduction was observed at 24 hours. The improved, excellent results in this study appear attributable to the alkaline pH shift that enhanced the activity of peracetic acid.

In the comparative study using 70 ppm $H_2O_2$+2 wt % KCl, the observed fluid viscosity reduction control and decrease in fluid viscosity at 24 hours post-treatment was only slightly better than that of 2 wt % KCl alone. In the comparative study using the high dosage of hydrogen peroxide, 350 ppm $H_2O_2$+2 wt % KCl, viscosity reduction control was poor since the observed decrease in fluid viscosity at both 3 hours and 24 hours post-treatment was significant.

In the comparative study using 600 ppm ammonium persulfate +2 wt % KCl, good viscosity reduction control was good, with moderate viscosity decline being observed at 3 hours post-treatment and with a significant reduction of fluid viscosity at 24 hours post-treatment. These results were similar to that obtained with only 75 ppm peracetic acid+2 wt % KCl, discussed above.

Example 5

Example 5 illustrates studies of the impact of peracetic acid treatments on modifying the viscosity of viscous aqueous fluids containing crosslinked hydroxypropyl guar as the viscosity-enhancing polymer. Two types of crosslinked hydroxypropyl guar (HPG) were used in this study: the first was borate-crosslinked HPG and the second was zirconate-crosslinked HPG. Borate will crosslink HPG only at alkaline pH values; borate-crosslinked HPG is reversible, e.g., at acidic pH values, and is rehealable, e.g., at alkaline pH values.

Zirconate, on the other hand, can crosslink HPG at both acidic and alkaline pH values, and such cross-linking is normally irreversible.

It should be noted that the substantial viscosity increases provided by crosslinked polymers such as crosslinked HPG can be difficult to replicate from sample to sample, even with otherwise identical concentrations and preparation conditions being used. Comparisons of absolute viscosity measurements from study to study should therefore not be given undue weight; viscosity changes over time for a single sample are more important.

The procedure used to prepare the borate-crosslinked aqueous fluid used in this study was as follows. The aqueous fluid was intended to simulate a well treatment fluid and was prepared in a Waring® blender by first combining 4.2 g (0.42 wt %) hydroxypropyl guar and 20 g KCl in one liter of Milli-Q deionized water. A crosslinked gel was then prepared by combining 40 g of the 0.42 wt % HPG aqueous fluid with 0.04 g $NaHCO_3$ and 0.02 g $H_3BO_3$ to dissolve the latter components and next adjusting the pH to 10.5 with $Na_2CO_3$ to crosslink the HPG at this pH. An alkaline pH of 10.5 was used for the peracetic acid treatment of the borate-crosslinked HPG, since borate-crosslinked HPG is stable only at alkaline pH values.

An analogous procedure was used for preparation of the Zr-crosslinked HPG. However, for comparative purposes, an acidic treatment pH of 4 was used for the peracetic acid treatment; zirconate-crosslinked HPG is normally stable at both acidic and alkaline pH values.

The fluid viscosity was measured at the treatment temperature, either 50° C. or 93° C., in a Brookfield PVS viscometer (Brookfield Engineering Laboratories, Inc., Middleboro, Mass.) with a B5 bob, at a shear rate of 50 $sec^{-1}$ and at atmospheric pressure (for the 50° C. treatment) or 600 psi pressure (for the 93° C. treatment); readings are reported in centipoise (cP). Viscosity measurements were taken periodically at post-treatment times ranging from 20 minutes to 24 hours, as indicated in the Tables 13, 14 and 15 below. The viscosity of control samples containing no added peracetic acid was also measured for baseline purposes, as shown in Tables 13, 14 and 15.

The peracetic acid used for the crosslinked HPG fluid treatments in this Example 5 was Peracetic Acid 15/10 (FMC Corporation, Philadelphia, Pa.), an equilibrated aqueous peracetic acid solution containing about 15 wt % peracetic acid, about 10 wt % hydrogen peroxide and about 36 wt % acetic acid. Sufficient peracetic acid was introduced in the aqueous fluid in each of the studies to provide the desired concentration, 7.5 ppm or 75 ppm peracetic acid.

Results for the peracetic acid treatment study of borate-crosslinked HPG aqueous fluid, in which the treatment temperature was 50° C. and pH was 10.5, are shown in Table 13 below.

TABLE 13

Peracetic Acid (15/10) Effect on Viscosity of
Borate-crosslinked Hydroxypropyl Guar-containing Aqueous Fluid
at 50° C. and pH 10.5

| Peracetic Acid, ppm | Time | | |
|---|---|---|---|
| | 0 hours | 3 hours | 24 hours |
| | | Viscosity, cP | |
| 0 | 2500 | 2800 | 2500 |
| 7.5 | 3900 | 2300 | 800 |
| 75 | 2300 | 1330 | 17 |

The results in Table 13 for peracetic acid treatment dosages of 7.5 and 75 ppm at 50° C. and pH 10.5 show that peracetic acid activity in reducing fluid viscosity was good at the lower dosage of 7.5 ppm at 24 hours post-treatment and was excellent at the higher dosage of 75 ppm at 24 hours post-treatment, reducing the viscosity to 17 cP in the latter case. In both cases, control of the viscosity reduction was excellent since there was no significant decline in the fluid viscosity at 3 hours post-treatment.

A further study was conducted using peracetic treatment dosages of 7.5 and 75 ppm on the same borate-crosslinked HPG but at a high treatment temperature, 93° C., to simulate treatment at a greater formation depth. Results for the peracetic acid treatment study of borate-crosslinked HPG aqueous fluid, in which the treatment temperature was 93° C. and pH was 10.5, are shown in Table 14 below.

TABLE 14

Peracetic Acid (15/10) Effect on Viscosity of
Borate-crosslinked Hydroxypropyl Guar-containing Aqueous Fluid
at 93° C. and pH 10.5

| no Peracetic Acid | | 7.5 ppm Peracetic Acid | | 75 ppm Peracetic Acid | |
|---|---|---|---|---|---|
| Time, minutes | Viscosity, cP | Time, minutes | Viscosity, cP | Time, minutes | Viscosity, cP |
| 20 | 1100 | 20 | 35 | 20 | 16 |
| 40 | 840 | 40 | 13 | 30 | 14 |
| 70 | 433 | 60 | 12 | 40 | 13 |
| 90 | 130 | 110 | 10 | 60 | 12 |
| 145 | 40 | | | | |
| 185 | 21 | | | | |
| 200 | 20 | | | | |

The results in Table 14 show significant viscosity reduction of the crosslinked HPG within a short time after treatment, e.g., within 20 minutes, for both the low 7.5 dosage of peracetic acid and the moderate dosage of 75 ppm peracetic acid. In both cases, control of the viscosity reduction was not good since there was a significant decline in the fluid viscosity within a short time after treatment.

Viscosities were very low, e.g., 13-14 cP, at about 30-40 minutes posttreatment with either of the peracetic acid concentrations, demonstrating that the lower 7.5 ppm peracetic acid concentration provides outstanding viscosity reduction performance, with no additional benefit being provided by the higher concentration dosage.

The results in Table 14 without peracetic acid treatment showed a gradual but significant decline in the viscosity of the borate-crosslinked HPG fluid at the high temperature employed (93° C.). Even in the absence of any peracetic acid, there was nearly a ten-fold reduction in fluid viscosity observed after 90 minutes and even further viscosity reduction after only three hours, reaching about 20 cP.

The high treatment temperature appeared to overshadow any controlled viscosity reduction otherwise achievable with the peracetic acid treatment, since significant viscosity reduction occurred within very short time, even without peracetic acid treatment of the aqueous fluid containing borate-crosslinked HPG viscosity-enhancing polymer used in this Example.

In another comparative study, this one using a zirconate-crosslinked HPG aqueous fluid at pH 4, peracetic acid was introduced into the Zr-crosslinked HPG fluid at a treatment temperature of 50° C. and pH 4; results are shown in Table 15 below.

TABLE 15

Peracetic Acid (15/10) Effect on Viscosity of Zirconate-crosslinked Hydroxypropyl Guar-containing Aqueous Fluid at 50° C. and pH 4

| Peracetic Acid, ppm | Time | |
| --- | --- | --- |
| | 3 hours | 24 hours |
| | Viscosity, cP | |
| 0 | 793 | 543 |
| 7.5 | 581 | 374 |
| 75 | 68 | 34 |

The results in Table 15 for peracetic acid treatment at 50° C. and pH 4 show that 75 ppm peracetic acid provided significant viscosity reduction at both 3 hours post-treatment and 24 hours post-treatment. At the lower dosage of 7.5 ppm the viscosity reduction at 24 hours post-treatment was only moderate, the fluid viscosity being ten-times higher than the fluid viscosity obtained with 75 ppm at this same time point.

It will be appreciated by those skilled in the art that changes could be made to the embodiments described above without departing from the broad inventive concept thereof. It is understood, therefore, that this invention is not limited to the particular embodiments disclosed but is intended to cover modifications within the spirit and scope of the present invention as defined by the appended claims.

What is claimed is:

1. A method of providing controlled viscosity-reducing activity in a well treatment fluid comprising
   introducing, into an aqueous well treatment fluid composition comprising a polymer or copolymer for increasing fluid viscosity or otherwise modifying fluid viscosity of the aqueous fluid composition, an agent for effecting a controlled reduction in the aqueous fluid viscosity in a subterranean environment; the viscosity-reducing agent comprising a peracetic acid in an amount of about 50 ppm to about 200 ppm wherein such amount is sufficient to provide viscosity reduction of the aqueous well treatment fluid composition in the subterranean environment to less than about 100 cP;
   adjusting the pH of the aqueous fluid composition, as necessary, to a pH value in the range of 7 to 10; and
   directing the aqueous well treatment fluid composition into a subterranean environment for which treatment is desired, the ground temperature of the subterranean environment being at least about 30° C.

2. The method of claim 1 wherein the temperature of the subterranean environment has a ground temperature of up to about 90° C.

3. The method of claim 2 wherein the temperature of the subterranean environment has a ground temperature of about 50° C. to about 80° C.

4. The method of claim 2 wherein the peracetic acid concentration and pH value are selected to provide substantial viscosity reduction after about 24 hours of the fluid's introduction to the subterranean environment but with such substantial viscosity reduction being delayed for at least about 3 hours after the initial directing of the fluid into the subterranean environment.

5. The method of claim 1 wherein the aqueous well treatment fluid composition further comprises a potassium salt, in an amount of about 0.5 wt % to about 5 wt %.

6. The method of claim 1 wherein the polymer or copolymer in the aqueous well treatment fluid composition is selected from the group consisting of acrylamide-derived polymers and copolymers; acrylate-derived polymers and copolymers; natural and synthetic polysaccharides and their derivatives; natural and synthetic cellulosic polymers and copolymers and their derivatives; ethylene oxide-derived polymers; and at least partially cross-linked derivatives of these polymers and copolymers.

7. The method of claim 1 wherein the polymer or copolymer in the aqueous well treatment fluid composition is present in an amount of about 0.01 wt % about 10 wt %, based on the weight of the aqueous fluid composition.

8. The method of claim 1 wherein the peracetic acid is introduced in an amount sufficient to provide viscosity reduction of the aqueous well treatment fluid composition in the subterranean environment to less than about 30 cP.

* * * * *